(12) United States Patent
Agrotis (10) Patent No.: US 12,214,758 B2
(45) Date of Patent: Feb. 4, 2025

(54) AUTOMATED FLUID DISPENSING SYSTEMS FOR CLEANING VISION-BASED SURFACES

(71) Applicant: Clear Lens Robotics, Inc., Yorktown, VA (US)

(72) Inventor: Demetris A Agrotis, Canton, MI (US)

(73) Assignee: Clear Lens Robotics, Inc., Yorktown, VA (US)

( * ) Notice: Subject to any disclaimer, the term of this patent is extended or adjusted under 35 U.S.C. 154(b) by 201 days.

(21) Appl. No.: 17/175,264

(22) Filed: Feb. 12, 2021

(65) Prior Publication Data

US 2021/0402961 A1     Dec. 30, 2021

Related U.S. Application Data

(60) Provisional application No. 63/044,379, filed on Jun. 26, 2020.

(51) Int. Cl.
| | |
|---|---|
| *B60S 1/54* | (2006.01) |
| *B60Q 9/00* | (2006.01) |
| *B60S 1/52* | (2006.01) |
| *G05B 13/02* | (2006.01) |
| *G08B 21/12* | (2006.01) |

(52) U.S. Cl.
CPC ............. *B60S 1/54* (2013.01); *B60Q 9/00* (2013.01); *G05B 13/0265* (2013.01); *G08B 21/12* (2013.01); *B60S 1/52* (2013.01)

(58) Field of Classification Search
CPC ...... B60S 1/54; B60S 1/52; B60S 1/56; B60S 1/481; B60Q 9/00; G05B 13/0265; G08B 21/12; A61L 2209/111; A61L 9/14; B08B 3/04; B08B 9/0321; B08B 9/0813
See application file for complete search history.

(56) References Cited

U.S. PATENT DOCUMENTS

| | | |
|---|---|---|
| 3,902,217 A | 2/1975 | Botz |
| 3,939,523 A | 2/1976 | Kolbe et al. |
| (Continued) | | |

OTHER PUBLICATIONS

U.S. Appl. No. 16/265,137, filed Sep. 12, 2019, Argotis, et al.
(Continued)

*Primary Examiner* — Douglas Lee
(74) *Attorney, Agent, or Firm* — Quinn IP Law (57) ABSTRACT

An automated fluid dispensing system, apparatus and method may be configured to automatically clean one or more vision-based surfaces. The system may include a hardware controller, a plurality of sensors, manifold ports, a plurality of pressure supply lines, first, second, and third fluid sources, a compressed air source, first, second, and third valves, a nozzle array, or a combination thereof. The controller may be in communication with a plurality of sensors and be configured to receive and adapt to one or more environmental and vision conditions of the one or more vision-based surfaces. The system may include an automatic response system to provide adaptive operations in response to the information herein such as internal and external parameters and operate under one or multiple pulse-width modulation (PWM) dispensing sequences in response to a determined condition (e.g., contamination state or level) associated with one or more vision-based surfaces.

20 Claims, 7 Drawing Sheets

(56) References Cited

U.S. PATENT DOCUMENTS

| | | | |
|---|---|---|---|
| 5,453,676 | A | 9/1995 | Agrotis et al. |
| 9,388,543 | B2 * | 7/2016 | Cacciotti ................. E01H 1/001 |
| 11,332,101 | B2 | 5/2022 | Shank et al. |
| 11,407,384 | B2 | 8/2022 | Agrotis et al. |
| 2016/0144831 | A1 * | 5/2016 | Caillot .................... B60S 1/481 |
| | | | 220/737 |
| 2016/0339875 | A1 * | 11/2016 | Ina .......................... B60S 1/522 |
| 2018/0290631 | A1 * | 10/2018 | Rice ......................... B60S 1/56 |
| 2019/0322245 | A1 * | 10/2019 | Kline .................... B60S 1/0848 |
| 2020/0216034 | A1 * | 7/2020 | Velasco .................. B60S 1/528 |

OTHER PUBLICATIONS

U.S. Appl. No. 15/627,307, filed Dec. 20, 2018, Yaldo, et al.
U.S. Appl. No. 15/095,876, filed Oct. 12, 2017, Jain, et al.
U.S. Appl. No. 14/846,906, filed Mar. 9, 2017, Hartman.
U.S. Appl. No. 16/431,656, filed Oct. 3, 2019, Davies, et al.
U.S. Appl. No. 13/953,064, filed Jan. 29, 2015, Stratton.
U.S. Appl. No. 12/071,832, filed Aug. 27, 2009, Ahmad.
U.S. Appl. No. 12/869,634, filed Jun. 30, 2011, Ahmad, et al.
U.S. Appl. No. 14/923,286, filed Feb. 18, 2016, Shank, et al.
U.S. Appl. No. 15/721,035, filed Mar. 29, 2018, Shank, et al.

* cited by examiner

AUTOMATED FLUID DISPENSING SYSTEMS FOR CLEANING VISION-BASED SURFACES

CROSS-REFERENCE TO RELATED APPLICATIONS

This U.S. Non-Provisional patent application is based on and claims priority to U.S. Provisional Patent application No. 63/044,379 filed Jun. 26, 2020, which is hereby incorporated by reference in its entirety.

BACKGROUND

Traditional vision, camera and sensor systems are prone to visual obstructions from naturally occurring materials, environmental factors, debris, moisture, and enemy attacks, thereby compromising the vision of associated autonomous vehicle platforms, tethered-control robotic systems and other electrically powered components. These obstructions typically require efforts to clean these sensors lenses and apertures; an activity performed manually by a user who, while under duress, is exposed to dirty and/or dangerous conditions. Typical lens cleaning systems further lack the ability to adapt to weather conditions, contaminants and impacts on a vision-based surface. Existing systems are unable to adapt to external parameters such as different theaters of operation, wide ranges of terrain, and environmental conditions. In addition, prior systems lack optimized performance, weight and power consumption, and system configuration flexibility.

There is a need for improved systems and methods to clear obstructions from vision, camera, sensor, and light detection and ranging (LIDAR) systems. These improved systems would allow autonomous vehicle platforms, tethered-control robotic systems and other electrically powered components and systems to adapt to visual obstructions for user safety and continued operation through mission completion while optimizing performance, weight, and power consumption. In addition, the system may be configured to adjust a system configuration and select the cleaning fluid combinations based on external parameters.

DETAILED DESCRIPTION

Exemplary systems may be configured as an automatic response system with adaptive operations in response to information as disclosed herein. Exemplary systems may be dynamically adaptable and/or configurable to clean vision-based surfaces in response to external parameters, e.g., any information relevant to one or more system, vision-based surface, or operation herein. External parameters may include, for example, external communications, theater of operation, environmental data, environmental condition, weather data, terrain data, vision condition, obstruction/contamination condition, contaminant type, level or location, transparency level, trip duration, or combination thereof. Any information herein may include an associated condition, type, state, level, location, duration, threshold, or a combination thereof.

Systems may include a controller or controller subsystem in communication with one or a plurality of sensors operatively connected to one or more vision-based surfaces. Systems may be configured to detect and measure an obstruction on one or more target vision areas of a vision-based surface, and activate and deploy fluids (e.g., liquid and/or air) to clean the one or more target vision areas.

Exemplary automated fluid dispensing systems and methods may include one or more controller (e.g., controller subsystem), pressure source, reservoirs, cap, sensor, actuator, connector, manifolds ports (e.g., supply, pressure, and/or distribution), distribution block, pressure control, distribution control, fluid source (e.g., liquid and/or air), valves, distribution manifold, distribution block, heat source, and nozzles.

The system may include one or a plurality of fluid sources, pressure sources, or a combination thereof. The fluid source may include a container such as a cylinder and contain a fluid such as a spray medium (e.g., liquid and/or air). The pressure source may include a container that is pressurized to a predefined pressure, in communication with a compressor to maintain the predefined pressure, or a combination thereof. The pressure source may be connected to a sensor (e.g., pressure sensor, temperature sensor, or any other sensor disclosed herein), a pressure source valve (e.g., one-way or multi-way valve) and manifold ports.

The manifold ports may be connected to a plurality of pressure supply lines in communication with any number of fluid sources (e.g., two, three, four, five, six, seven, eight, or more). Each fluid source may have one or more respective containers or reservoirs, e.g., one or a plurality of containers or reservoirs (e.g., two, three, four, five, six, seven, eight, or more). Each fluid source may be configured to contain and selectively provide respective one or more fluid types (e.g., two, three, four, five, six, seven, eight, or more). The fluid sources may be in communication with one or a plurality of spray medium valves (e.g., first, second and third spray medium valves) and a distribution manifold. The distribution manifold may be in communication with one or a plurality of distribution valves (e.g., first, second and third distribution valves), a distribution block, and one or more nozzles. The nozzles may be configured to clean one or more target vision areas of optical, camera aperture, LIDAR, global positioning system (GPS), and/or other sensor system having surfaces, openings and/or lenses that may require cleaning to appropriately function.

The controller or controller subsystem may be configured to selectively activate one or a plurality of valves (e.g., first, second and third valves) to distribute of the respective fluid types (e.g., first, second and third fluid types) to the target vision area in response to the plurality of sensors. The system may include any number of the components herein, e.g., valves, sensors, fluid types, nozzles, and manifolds. This may include one or a plurality of components such as one to eight or more.

The system may be configured to dynamically adapt to one or a plurality of conditions to clear, clean, and optimize vision-based surfaces. Vision-based surfaces may include any transparent, translucent, semi-opaque, or combination surface. An exemplary vision-based surface may include a lens, sight, or a combination thereof. The system may be part of, integral to, or mounted on any robotic, autonomous, or tethered system. The system may be configured for military, commercial, and/or residential system in any land, air, maritime, and/or space application.

The system may include or be adapted to any vision-based surface. Vision-based surfaces may include any vision, optical or sensor surface such as vision, imaging, camera, and LIDAR systems. This may include any robotic ground system such as robotic, autonomous, and/or vehicle systems. Embodiments may be adapted for systems of any gross vehicle mass (GVM), e.g., light, medium, and heavy vehicles. Embodiments may be adapted for next generation systems, e.g., purpose-built, multi-axle, ruggedized, fuel-efficient, and/or multi-wheel drive vehicles. Embodiments may be adapted for systems having with pre-configured, adaptive, and/or dedicated payload area configured according to mission requirements. Embodiments may be adapted for vision-based surfaces of robotic, semi-autonomous, and autonomous transportation operations including drones.

Embodiments may be adapted for vision-based surfaces of robotic combat vehicles (RCV), e.g., light, medium, and heavy. Embodiments may be adapted for optionally manned vehicles, e.g., optionally manned tanks (OMT) and optionally manned fighting vehicles (OMFV). Embodiments may be adapted for leader/follower (L/F) palletized load system vehicles, autonomous convoy operation (ACO) vehicles, autonomous indirect fire platforms, joint light tactical vehicle (JLTV) platforms, robotic assault breacher vehicles (R-ABV), robotic assault bridge launching vehicles (R-ABLV), robotic engineer smoke obscuration tracked vehicles, route clearance interrogation systems (RCIS), drones or a combination thereof.

Embodiments may be adapted for vision-based surfaces of medium systems such as robotic and autonomous vehicles. Embodiments may include man transportable robotic systems (MTRS) (e.g., increment two), common robotic systems (e.g., medium and heavy), small multipurpose equipment transports (SMET) (e.g., increments one and two), and M160 light flail vehicles. Embodiments may include any type of aircraft or drone system. Embodiments may include autonomous and semi-autonomous vehicle safety systems including, for example, rear vision cameras, lane departure warning systems, autonomous driving systems, autonomous breaking systems, or a combination thereof.

Embodiments may be adapted for vision-based surfaces of maritime systems such as robotic maritime systems. Embodiments may include maritime support vessels (e.g., light, heavy, or next generation), maritime autonomous security vessels, and maritime remote firing weapons stations.

Exemplary systems be adapted for vision-based surfaces of robotic payloads, stationary platforms, and one or multi-mission payloads for robotic platforms. Examples may include target acquisition sensors and optics, laser range finders, chemical sensors, radiological sensors, active protection systems, radar application systems, or a combination thereof. Embodiments may be adapted for security and observation tower optics and sensors, and stationary remote firing weapons stations.

Embodiments may be adapted for manned combat vehicle platforms. Examples may include M1 Abrams main battle tank, M2/M3/M7 Bradley systems, armored multi-purpose vehicles (AMPV), Stryker vehicle systems, mobile protected firepower systems, M109 Paladin fire support vehicles, optionally manned fighting vehicles (OMFV), joint light tactical vehicles (JLTV), Infantry Squad Vehicles (ISVs), and palletized load system (PLS) vehicles.

In embodiments, an automated fluid dispensing system, apparatus and method may be configured to automatically clean one or more vision-based surfaces. The system may include a hardware controller, a plurality of sensors, manifold ports, a plurality of pressure supply lines, first, second, and third fluid sources, first, second, and third valves, a nozzle array, or a combination thereof. The controller may be in communication with a plurality of sensors configured to receive an environmental condition and a vision condition of the vision-based surface. The manifold ports may be connected to a pressure source and a plurality of pressure supply lines. The first, second, and third fluid sources may have respective first, second and third fluid types, and be in communication with respective ones of the plurality of pressure supply lines. The first, second, and third valves may be in fluid communication with the respective first, second, and third fluid sources. The nozzle array may be arranged according to the vision-based surface.

Embodiments may include a system, apparatus, and/or method configured to automatically clean one or more vision-based surfaces in response to sensor information, user inputs, and/or external parameters. The controller may communicate with a plurality of sensors to detect and measure external parameters such as an environmental condition, a vision condition, and a target vision area of the vision-based surface. The controller may automatically select, a mixture type (e.g., one or more fluid types and/or pressurized air), and an operation type (e.g., one or more spray pattern and/or sequence) according to the determined external parameters, e.g., environmental condition, vision condition, and target vision area.

An exemplary sequence may utilize pulse-width modulation (PWM) in response to sensor information, user inputs, and/or external parameters. The systems herein may include operations using one or multiple pulse-width modulation (PWM) dispensing sequences in response to sensor information, user inputs, and/or external paramerters (e.g., a contamination condition, state and/or level) of one or more vision-based surfaces.

The controller may automatically clean (e.g., by way of the nozzle array) the vision-based surface by distributing the selected mixture type of any quantity of fluid types (e.g., one, two, three, four, five, six, seven, eight, or more) to the target vision area using a selected operation type (e.g., PWM sequence). The controller may selectively activate any quantity of valves (one, two, three, four, five, six, seven, eight, or more) to release the various fluid types and/or pressurized air according to the selected mixture type.

The systems and methods herein may be configured for automated dispensing and cleaning operations. Operations may include to automatically determine an initial condition (e.g., vision, obstruction, contamination, and/or transparency) according to user inputs, sensor information, and external parameters, automatically select one or more operation type for cleaning parameters such as fluid media type, fluid volume, air volume, injection time, mixture, applied pressure, temperature, spray sequence, spray duration/time, and/or spray direction/pattern, automatically deploy fluid (e.g., liquid and/or air) according to the selections, automatically determine an updated vision condition according to at least one of user inputs, sensor information, and external parameters, automatically compare the initial and updated vision conditions to a threshold, and automatically adapt the cleaning parameters based on such comparison.

Figure 1:
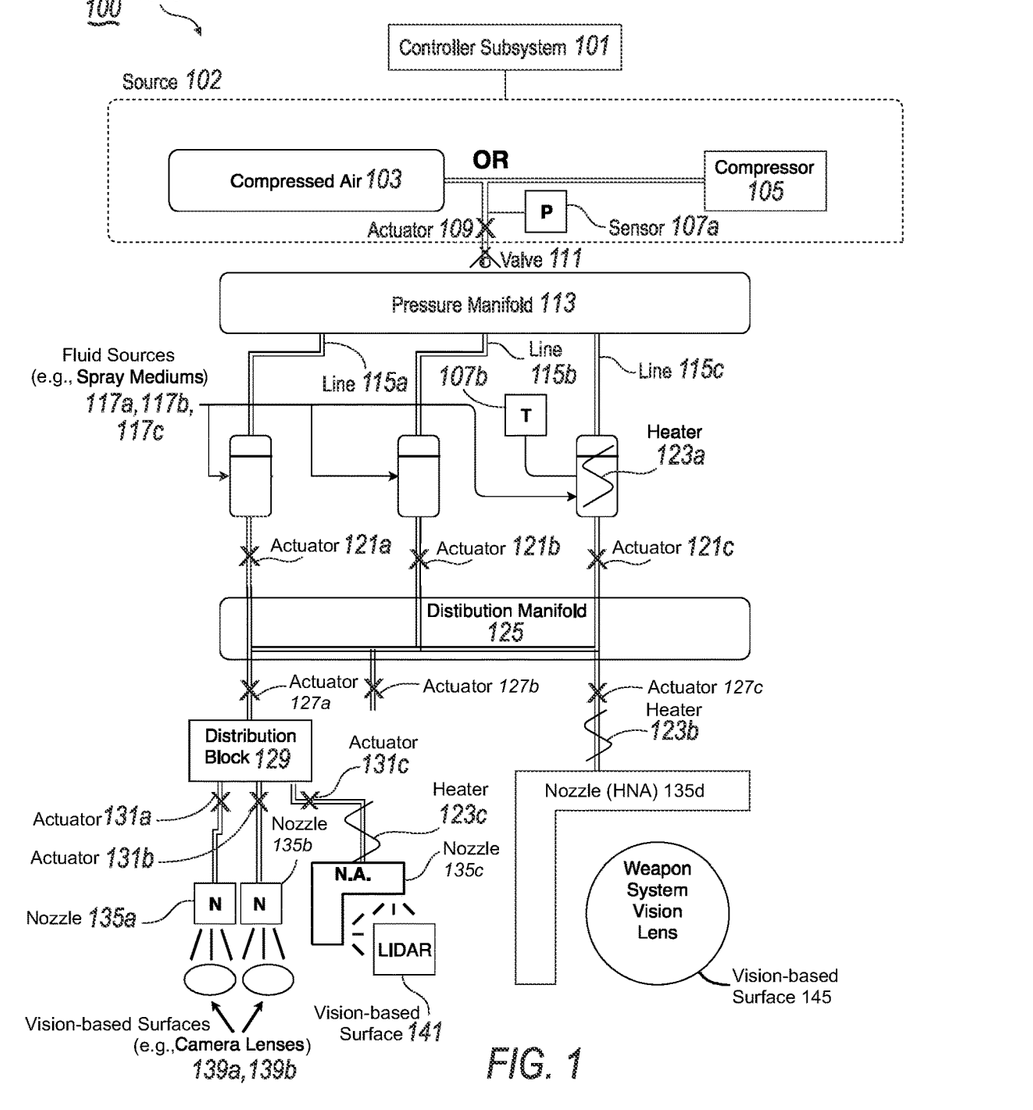
FIG. 1 illustrates an exemplary system of the present disclosure.

FIG. 1 illustrates an exemplary system 100, for example, configured for automated fluid and/or pressurized air dispensing. System 100 may take many different forms and include multiple and/or alternate components, structures, and arrangements. While an exemplary system 100 is shown, the exemplary components are not intended to be limiting, and additional or alternative components and/or implementations may be used.

FIG. 1 illustrates an exemplary system 100 of the present disclosure, e.g., an intelligent automated system for cleaning vision-based surfaces. System 100 may include any or all of controller subsystem 101, source 102 (e.g., one or more sources such as compressed air containers 103, compressor 105, or a combination thereof), sensors 107a, 107b (e.g., any sensor such as a pressure sensor, temperature sensor, any other sensor disclosed herein, or a combination thereof), actuators 109, 121a, 121b, 121c, 127a, 127b, 127c, 131 (e.g., any mover such as a solenoid or pump), valve 111 (e.g., one-way or multi-way valve), pressure manifold 113 (e.g., aluminum, plastic and/or steel manifold ports), supply lines 115a,b,c (e.g., air supply lines), sources 117a,b,c (e.g., fluid source of liquid and/or air), heat sources 123a,b,c (e.g., heaters or heated lines), distribution manifold 125 (e.g., including manifold ports), distribution block 129, nozzles 135a, 135b, 135c, 135d (e.g., nozzles 135a, 135b, nozzle array 135b, and heated nozzle array (HNA) 135d), and vision-based surfaces 139a, 139b, 141, and 145.

Sources 117 may include fluid sources of liquid and/or air. Sources 117 may include one or more pressurized fluid source and/or pressurized air source. Sources 117 may contain spray mediums of one or more types of fluids (e.g., liquids and/or gasses). Sources 117 may include pressurized liquid and/or air. Sources 117 may include respective containers or cylinders for containing fluids (e.g., liquid and/or air).

Sensors 107 may include one or more pressure, temperature, fluid level, humidity, rain detection sensors, cameras, LIDAR, or a combination thereof. Sensor inputs of sensors 107 will deliver inputs 102 to ECU 207 as well as provide signals through the ECU 207 to platform electronics 211.

Vision-based surfaces 139, 141, and 145 may include any surface of a lens, optical, light, vision, camera, mirror, image, LIDAR, or combination system. Vision-based surfaces 139a, 139b may include a vision or camera lens. Vision-based surface 141 may include a detection lens such as for light detection and ranging (LIDAR)). Vision-based surface 145 may include a vision lens of weapons or vehicle system.

System 100 may be configured for dispensing fluids (e.g., liquid and/or air) onto one or more vision-based surfaces. System 100 may include, be part of, or be configured for an autonomous system (e.g., fully or semi-autonomous operations), or a tethered system (e.g., user-initiated operations). System 100 may include sensors 107 configured to detect and measure a transparency and/or obstruction level and locations with respect to one or more vision-based surfaces. System 100 may be configured to reduce and remove obstructions from vision-based surfaces.

System 100 may be configured to respond to external parameters such as weather conditions, contaminants, and surface impacts on vision-based surfaces (e.g., sensors). System 100 may be configured to adapt to external parameters such as different theaters of operation, wide ranges of terrain and weather conditions, and provide optimal performance at minimal weight and power consumption. In response, controller 101 may be configured to generate a mixture type, an operation type, and a target vision area and cause system 100 to pressurize, mix, and spray one or more fluids and/or pressurized air to clean one or more target vision areas of the vision-based surfaces 139, 141, 145.

System 100 may be configured for use with combustion engine-powered, electric-powered, and hybrid-powered systems related to, for example, robots, vehicles, drones and weapons. System 100 may be configured to operate with minimal or without human intervention. System 100 may receive user inputs from remote control, tele-operated, or externally operated systems in response to an operator determining that vision-based surfaces 139, 141, 145 are obscured. System 100 may determine that vision-based surfaces 139, 141, 145 are obscured in response to a degraded signal, e.g., degraded LIDAR feedback. System 100 may be autonomously activated in response to sensor inputs indicating occlusion of vision-based surfaces 139, 141, 145, e.g., sensor inputs of sensor 107.

Human verification may be utilized for potentially harmful or lethal engagements. System 100 may utilize remote-operated, semi-autonomous, and autonomous platforms while target engagement is verified by a user such as a soldier, e.g., for "soldier-in-the-loop" operations that require human verification before engagement. System 100 may require positive identification and/or a clear, non-occluded view of the target, and/or user verification prior to engagement. System 100 is configured to optimize verification, mobility, and robotic functionality.

System 100 may be configured as a modular and/or configurable lens cleaning system. System 100 may be configured to provide optimal (e.g., reduced) power consumption and weight. System 100 may adapt for each military mission based on varying environments, climatic conditions, obstructions, and vehicle platform architectures. System 100 may be configured to inject pressurized air that is modulated with heated fluid and onto the contaminated vision-based surface, e.g., to emulsify, remove and/or dry contaminants to clean and dry lenses.

One or a plurality of fluids and/or pressurized air may be selected by the controller 101 according to information such as a contaminant type, an environmental condition, system status, a vision condition, a vision/lens clarity, available fluid types and/or volumes, or a combination thereof, e.g., as detected and measured by sensors 107. Controller 101 may include or be in communication with a hardware processor, hardware display (e.g., control screen), and physical memory with an algorithm of a program that receives and/or displays information from sensors 107 and/or user inputs to provide the operations herein.

For example, the program may include an algorithm to provide the operations herein associated any component of the systems herein, e.g., vision-based surfaces 139, 141, 145. User inputs, sensor information (e.g, via sensors 107), or a combination thereof may provide such information including a status of available fluids (e.g., types and/or volumes), contaminant types, environmental conditions, vision condition, vision/lens clarity, or a combination thereof. Further, the system may determine the status of one or more vision-based surfaces and automatically initiate cleaning of the vision-based surfaces in response to the algorithm. The system may also determine the status in response to user inputs of an operator looking through the vision-based surface (e.g., a camera) or a control screen that is being fed the vision images from the various vision-based surfaces 139, 141, 145.

The systems herein may utilize artificial intelligence (AI) to automatically adapt the operations herein. Systems may include a program having an AI-based algorithm. Systems may continuously monitor, adapt and optimize responses based on sensor information, user inputs and/or external parameters. Systems herein may be trained and learn to optimize responses based on contamination and/or environments. Systems may adapt fluid selections and mixtures prior to, during, and after each use, e.g., a mission. Systems may, using an AI-based algorithm, continuously monitor, and adapt the "performance" of the system, cleaning effectiveness, and use of expendable resources. Systems may be actively training and learning to establish optimal fluid dispensing using partially or fully automated operations. For example, the AI-based algorithm may automatically generate adapted or new operations in response to the system being remote, lack of viable image, and/or obstructions.

System 100, by way of controller or controller subsystem 101, may select and deploy one or a mixture of fluids and/or compressed air. For purposes of this disclosure, "fluid," "fluid-air," or "fluid medium" may be used interchangeably to mean any flowable substance such as a liquid, gas (e.g., air), or a combination thereof (e.g., liquid, gas, and/or particulates). The system may deploy fluid according to a mixture type and an operation type corresponding to the contaminant type, environmental condition, and/or vision condition. Fluid types may include water, air, antifreeze, thinner, solvents, alcohol, glycerin, methanol, ethanol, ethylene glycol, cleansing fluids, or a combination thereof. One or a mixture of fluids may be selected and deployed accordingly external parameters and as appropriate for the environment, theater of operation, obstructions, or a combination thereof.

System 100 may be configured for industrial and commercial applications. This may include mining equipment, specialized trucks, drones, autonomous vehicles or robotic vehicles and their associated payloads. System 100 may be configured to adapt to external parameters (e.g., as disclosed herein) for optimal performance.

Pressure source 102 may be configured to generate, supply, and maintain pressurized air in communication with fluid sources 117. Pressure source 102 may include a compressed air 103 (e.g., pressurized containers or cylinders), compressor 105, or a combination thereof. Pressure source 102 may provide and selectively maintain pressure as needed (e.g., pressurize) using a pre-pressurized container or an integrated pressure source in communication with fluid-air sources 117.

Sources 117 may include cylinders of various volumes and fluid and/or air types based on the vehicle, mission, and/or external parameters (e.g., as disclosed herein). One or more fluid sources 117 may include containers (e.g., cylinders) having unique identifiers using color codes, specific markings, symbols, shapes, or other identification types. The system 100 may include software and hardware configured to warn a user or operator of the possibility that installing such fluids may cause harmful chemical reactions if mixed.

Sources 117 (e.g., fluid-air sources 117a, 117b and 117c) may be selectively heated by heat source 123 based on environmental conditions such as weather data and theater of operation. Fluid-air sources 117 may include a fluidic, quick-connect device that allows for quick replacement and/or selection of fluids and/or air.

System 100 may include supply lines 115 and actuators 109, 121, 127, and 131 configured to one or a plurality of fluid types. System 100 may include one or a plurality of heat sources 123a, 123b, 123c. ECU 207 may be configured to select fluid types and/or air and apply heat in response to external parameters, e.g., according to sensors 107.

System 100 may include nozzles 135a, 135b, 135c, 135d arranged near target, vision-based Surfaces. Nozzles 135 may be positioned in discreet or array configuration. Nozzles 135 may be configured to be heated based on theater of operation and environmental conditions. System 100 may be configured to detect and respond to malfunctions based of outcomes following cleaning operations on a target, vision-based surface.

Sources 117 (e.g., fluid-air sources) may include fluidic and/or compressed air containers or cylinders having one or a plurality of fluid types. Fluid-air source 117 may including varying fluidic chemicals or compositions. Fluid-air sources 117 may include heat source 123. Heat source 123 may be arranged in or around or integral to any component herein, e.g., providing heated cylinders.

System 100 may include pressure manifold 113, actuators 109, 121, 127, 131, and distribution manifold 125. These may include quick-connects to accommodate one or multiple fluidic and/or compressed air containers of any size, structure and number of ports based on the associated vehicle platform. System 100 may include a fluidic reservoir for be configured to replenish the fluid-air sources 117, e.g., including higher demand fluids. The fluidic reservoir may include level sensors to provide feedback on the remaining fluid amount.

System 100 may include actuators 109, 121, 127, 131 including or in addition to a pump. The components herein may be configured for refilling or re-pressurizing fluid sources 117, e.g., in standard, mission non-critical and fluid empty modes. Fluid-air sources 117 may include an assortment for fluids to clean targeted areas. This may include harsh chemicals capable of cleaning paint as well as other harsh materials that obstruct (e.g., occlude or opaque) the targeted area of interest. Fluid-air sources 117 may include symbols or colors on each cylinder. Such symbols may be scannable to ensure that certain combinations of fluid are not installed on the same vehicle to minimize the possibility of explosions, chemical fumes, or gasses that could be harmful.

System 100 may be configured to dispense a combination of fluids of varying chemical compositions to the targeted areas. For example, in a battle environment, an enemy may use a paint spay onto the vison system elements of an autonomous platform thus rendering the platform without vision or "blind" and as such unable to execute the operations herein according to a targeted use. System 100 may be configured to adapt by flexibly selecting fluids in response to real-time enemy threats that were previously not envisioned. System 100 may be configured to utilize new fluid configurations to address attempts by others BLIND the vehicle platform.

Nozzles 135a, 135b, 135c, 135d may include various arrays of nozzles in a shape and size configured to the targeted area. Nozzle 135d may be configured as a heated array. Nozzles 135a, 135b may be supplied with fluid by distribution manifold 125 and distribution block 129 and be heated. Nozzle 135d may be delivered fluid by distribution manifold 125.

Figure 2:
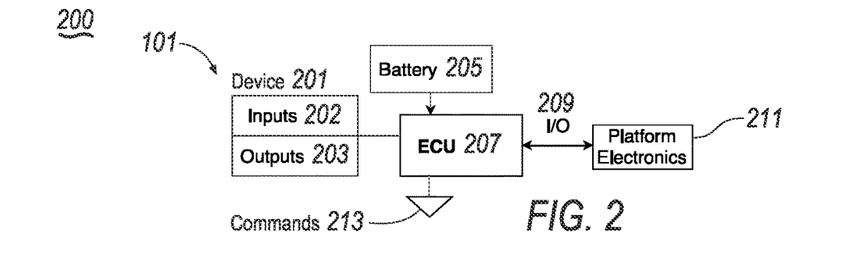
FIG. 2 illustrates an exemplary system of the present disclosure.

FIG. 2 illustrates an exemplary system 200, e.g., as part of system 100. System 200 may take many different forms and include multiple and/or alternate components, structures, and arrangements. While an exemplary system 200 is shown, the exemplary components are not intended to be limiting, and additional or alternative components and/or implementations may be used.

System 200 may include device 201, inputs 202, outputs 203, battery 205, electronic control unit (ECU) 207, input/output (I/O) device 209, platform electronics 211 (e.g., autonomous control system, vehicle platform control system, and/or weapon systems that are stationary, remotely operated and/or movable), and commands 213. ECU 207, sensors 107, and platform electronics 211 may be in communication with each other to generate commands 213 for the components of system 100. Sensors 107 may exchange inputs 202 and outputs 203 with ECU 207 and platform electronics 211 through I/O device 209. Battery 205 may be configured to provide electrical power to device 201, ECU 207, I/O device 209, and platform electronics 211.

Any component of the systems herein, e.g., device 201, ECU 207, and platform electronics 211, may include a hardware processor, physical memory, a hardware transceiver, and a hardware display to respectively execute, store, transfer and display the operations, inputs 202, and outputs 203. For example, ECU 207 may include or be in communication with a hardware processor, hardware display, and physical memory with instructions, an algorithm, and/or a program to provide the operations herein. Any or all the operations, functions, and controls of ECU 207 may be in communication with or embedded into a vehicle controller, e.g., an electronic control unit that reads cameras, LIDAR, sensors and/or other vision systems, which may replace or be in addition to ECU 207.

Controller subsystem 101 may exchange inputs 202 (e.g., sensor, vision surface inputs such as camera, LIDAR, etc., and/or user inputs) and outputs 203 (sensor and/or user feedback) between device 201, ECU 207, and platform electronics 211. Device 201 may include one or more sensors 107, a tethered device with a console command center (CCC), or a combination thereof for exchanging inputs 202 and outputs 203 with ECU 207 and platform electronics 211 through I/O device 209. Controller subsystem 101 may be configured to utilize battery 205 including low amperage DC power and pressure source 102 including as a pressure source using compressed air (e.g., bottled, compressor or pneumatic take off).

ECU 207 may include fluidic control valves to selectively dispense fluids (e.g., liquid and/or air) such as in response to platform electronics 211 and/or device 201 depending on platform requirements and complexity. ECU 207 may be configured to adjust (e.g., increase and/or decrease) a fluid pressure of pressure source 102 in communication with fluid-air sources 117 (e.g., spray medium containers) by utilizing atmospheric pressure by way of a pressure release valve, e.g., part of or near actuators 109, 121, 127, 131. Actuators 109, 121, 127, 131 may be positioned any wherein in the systems herein (e.g., before or after fluid-air sources 117) to increase the pressure in the fluid-air sources 117 and facilitate access to valves 111, pressure control 507, and distribution control 509. ECU 207 may be configured to re-pressurize pressure source 102 and/or fluid and/or compressed air source 117 to a higher pressure. System 100 may include a pump to transfer fluid into the fluid source 117 at atmospheric pressure. ECU 207 may de-activate the replenishment valve and/or close the pressure release valve, e.g., after the fluid and/or compressed air source 117 is re-pressurized.

Figure 5:
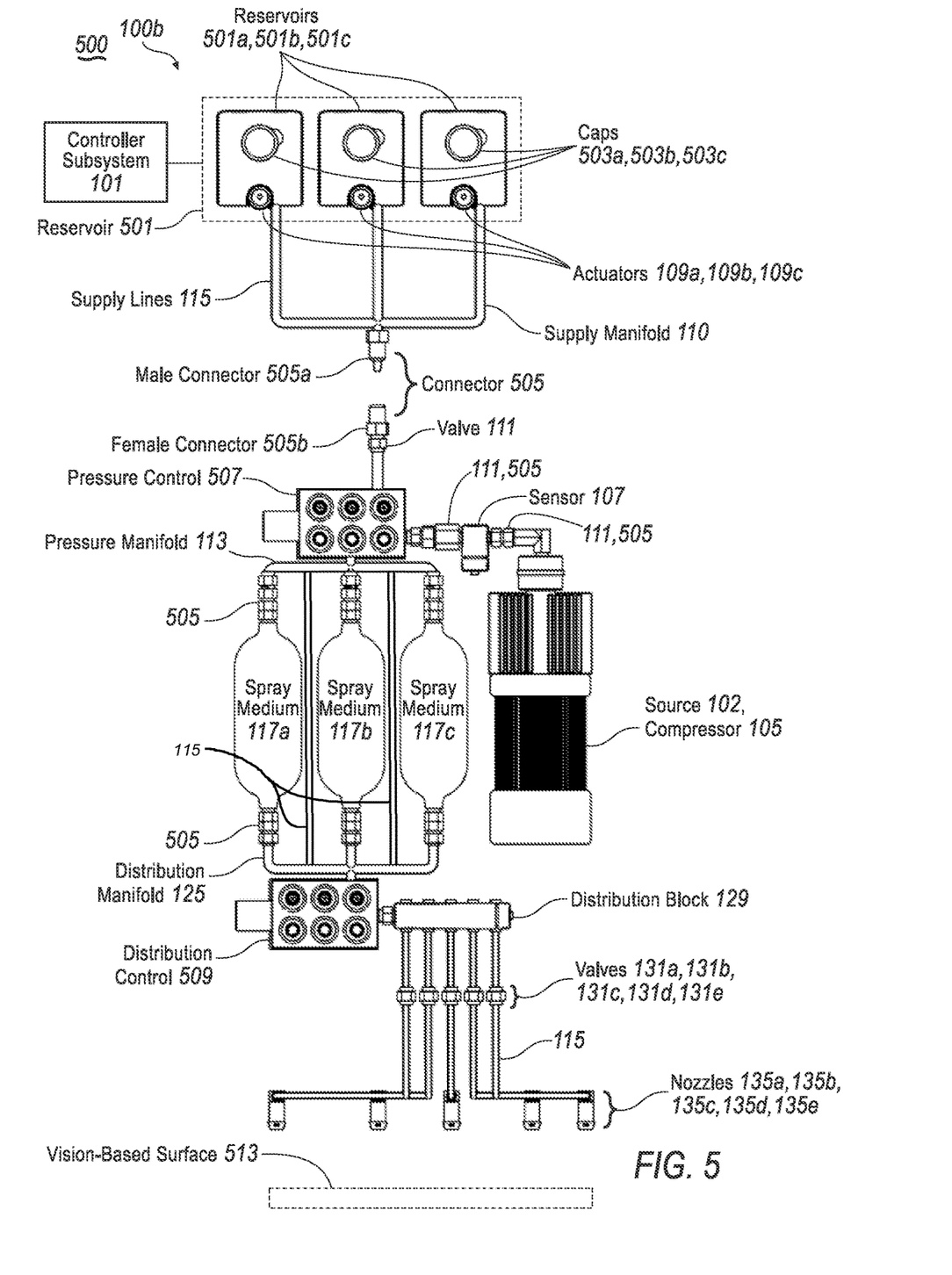
FIG. 5 illustrates a top view of an exemplary system of the present disclosure.
Figure 6:
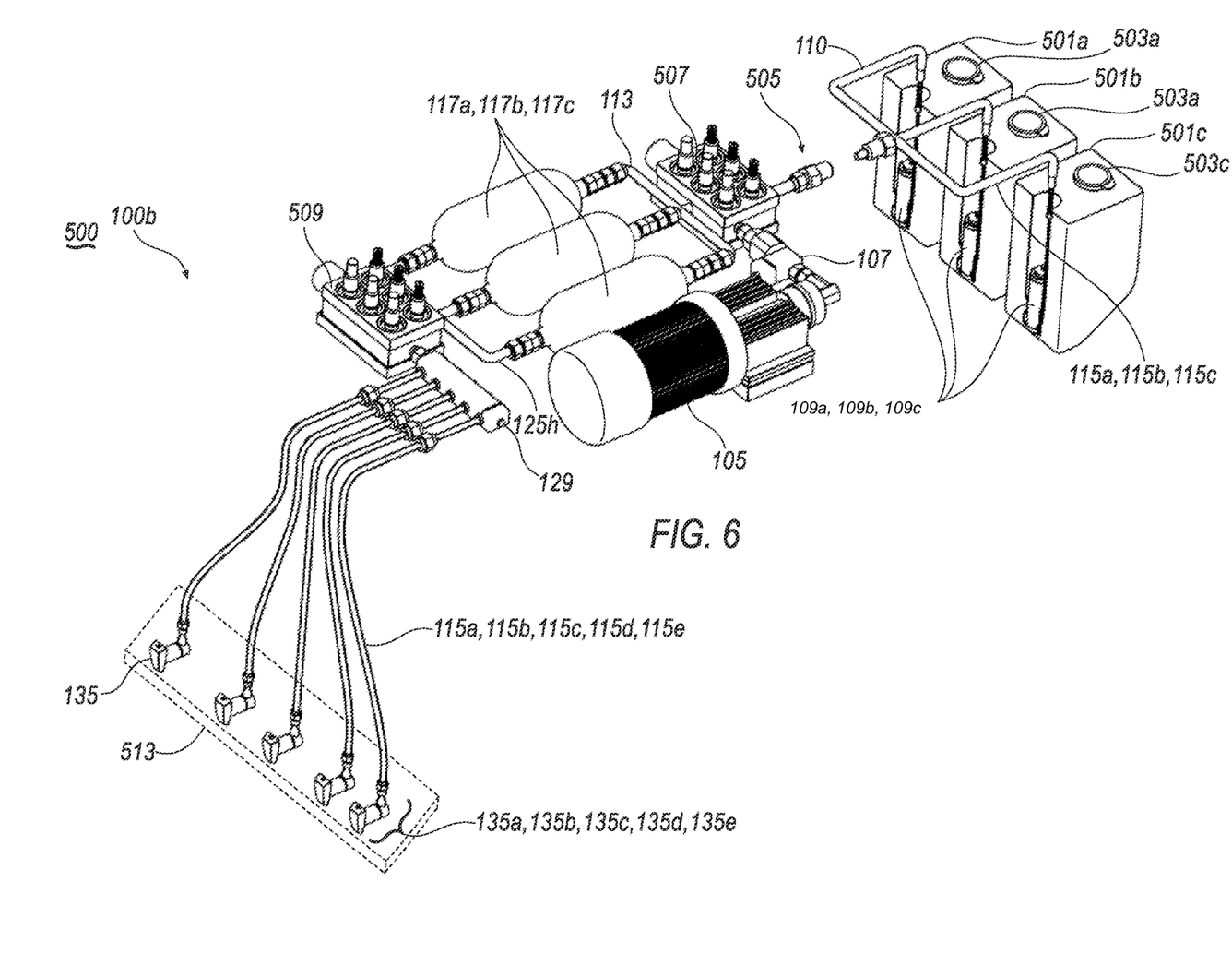
FIG. 6 illustrates a first isometric view of an exemplary system of the present disclosure.
Figure 7:
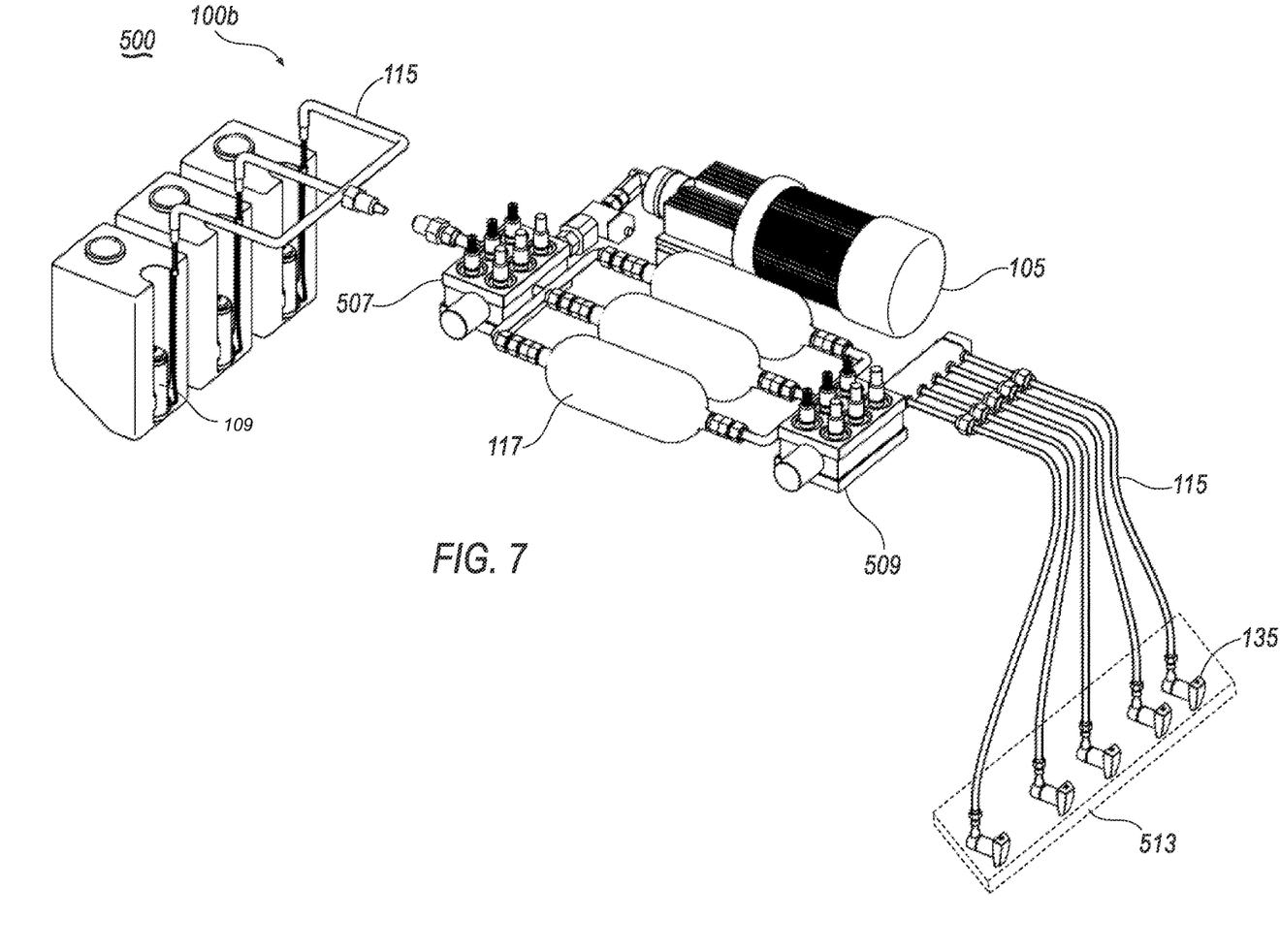
FIG. 7 illustrates a second isometric view of an exemplary system of the present disclosure.
Figure 8:
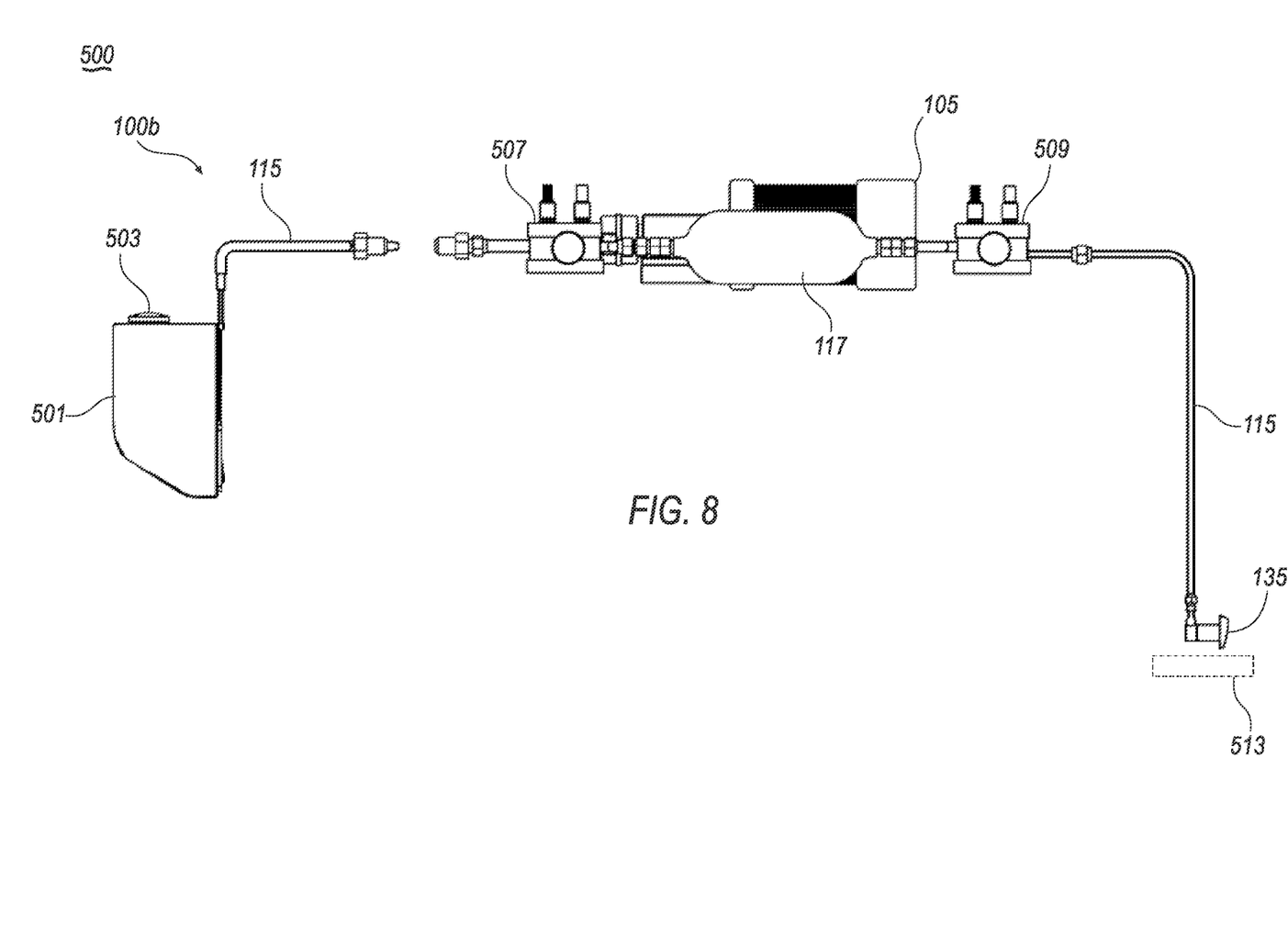
FIG. 8 illustrates a side view of an exemplary system of the present disclosure.

Device 201 and/or sensors 107 may be part of or receive information (e.g., data) from any component, environment, or user of systems 100, 200, and/or 500, or any device or vehicle in communication with systems 100, 200, and/or 500. For example, device 201 and/or sensor 107 may be part of, positioned near, and/or receive information from any component of system 100, e.g., vision-based surfaces, actuators, valves, connectors, compressed air, compressors, pressure/fluid sources, fluid mediums (e.g., fluid including liquid and/or air), heaters, lenses, reservoirs, supply lines, supply/pressure/distribution manifolds, pressure/distribution controls, distribution blocks, nozzles, electronics, batteries, users, environments, or a combination thereof. For example, device 201 and/or sensors 107 may include one or more pressure, temperature, fluid level, humidity, rain detection, transparency, photoelectric, or combination sensors. Device 201 and/or sensors 107 may exchange inputs 202 and outputs 203 with each other or any component of system 100 and platform electronics 211 through I/O device 209.

In embodiments, ECU 207 may receive sensor information (e.g., sensor outputs) from pressure sensors to determine whether pressure source 102 is pressurized and ready to inject air. ECU 207 may receive sensor outputs from temperature sensors to adapt and optimize the temperature of fluid-air sources 117a, 117b, 117c and lenses 139, 141 and 145, e.g., in response to environmental and target area temperatures. ECU 207 may receive sensor outputs from level sensors to determine a fluid level of reservoirs 501, e.g., for notifications, replacement with spare fluid-air sources 117 (e.g., medium containers) or refill fluid by way of a fluid replenishment reservoir. ECU 207 may receive sensor outputs from humidity and/or rain sensors to optimize the deployment of spray and/or air medium.

ECU 207 may receive sensor information such as external parameters directly from the sensors 107 such as vison sensors (e.g., cameras, LIDAR, etc) and/or from other vehicles or controllers (e.g platform electronics 211). ECU 207 may receive external parameters including vision, theater of operation, environmental, and tactical nature information. ECU 207 may receive information transferred from other connected devices or vehicles operating in the same geographical location and subjected to the same environment and or enemy actions. System 100 may utilize any sensors 107 configured to provide data to enhance the efficiency of the system 100, e.g., regarding power consumption, speed of response, minimal use of fluid and air, and spray amount and duration.

ECU 207 may be configured to control and adapt a response of sources 117 (e.g., fluid-air sources 117a, 117b, 117c) according to information of sensors 107, device 201, inputs 202, outputs 203, platform electronics 211 or a combination thereof. ECU 207 may adapt the fluid type, spray type or pattern, order, heat, viscosity, concentration, duration, type, mixture, sequence, or combination of fluid-air sources 117. ECU 207 may adapt the response of fluid-air sources 117 based on a plurality of external parameters (e.g., as disclosed herein). ECU 207 may adapt the response of fluid-air sources 117 in response to the remaining amount and types of fluid-air sources 117. ECU 207 may adapt the response of fluid-air sources 117 in response to heuristic and/or real-time information of one or a plurality of other systems 100 and/or devices 201.

ECU 207 may receive automated commands from the platform electronics 211 (e.g., vehicle platform control system) and/or user feedback from device 201. System 100 may, e.g., in response to platform electronics 211 and/or device 201, selectively activate and control valves to dispense predefined or user-defined selections of fluid or air amounts, fluid or air durations, or a combination thereof to the target surfaces based on an obstruction level of the target surface. ECU 207 may also selectively control heat sources 123a, 123b, 123c in response to sensor 107, e.g., a temperature sensor to control a temperature of cylinders, distribution lines, nozzles, or a combination thereof. ECU 207 may operate in response to and based on an obstruction level of a target vision surface and environmental conditions.

ECU 207 may be configured to be flexible to select fluid type and volume of sources 117 (e.g., fluid sources of liquid and/or air). This may be in response to operator specifications and/or platform electronics 211 (e.g., artificial intelligence from a vehicle platform). ECU 207 may receive and be informed of enemy obstruction strategies from other autonomous platforms in the theater of operation to optimize its selection of chemicals and spray patterns to deploy fluids, e.g., in response to being exposed to obstructions such as from an enemy obstruction strategy.

ECU 207 may dynamically adapt to the external parameters (e.g., via real-time updates) to minimize the time, effort, and energy needed to clean an obstructed lens. ECU 207 may employ a sequence using a closed loop control with feedback from platform electronics 211, device 201, or a combination thereof. ECU 207 may respond and adapt to an effectiveness of a sequence of fluid (e.g., liquid and/or air) dispensing, e.g., whether the first sequence reached a cleanliness threshold (e.g., percentage of target area that is clean or transparent) or whether a second sequence is necessary to reach the cleanliness threshold.

Controller subsystem 101 may be configured to selectively respond (e.g., stand-by and wake-up) based on sensing parameters, temperature sensors, periodic wake up of a camera, rain sensing, sensor/user feedback, radar, signals from other combat vehicles in the theater of operation, and/or messages received via satellite communication from a central command system or smart vehicle to infrastructure (V2I) messages. This allows military vehicles that are in a standby or mission mode to conserve energy while at the same time, upon the vehicle platform starting to control and navigate the vehicle, execute the operations herein for its mission. As such, the system may ensure optimal operation by being ready to fire automatically upon vision-based surfaces being clean and without waiting on a "proceed" or "activate" command.

System 100, by way of controller subsystem 101, may be configured to dispense only air, only one fluid from the available fluid sources or a combination of any of the available sources of air and fluids. System 100 may be configured to support a stationary remote military gun system by ensuring its optics are always clean and as such it will ensure that the weapon system is always ready to fire as commanded. Such configurations can be portable, not integrated into the weapon systems, as well as configurable per the environment of the theater of operation of the mission.

Figure 3:
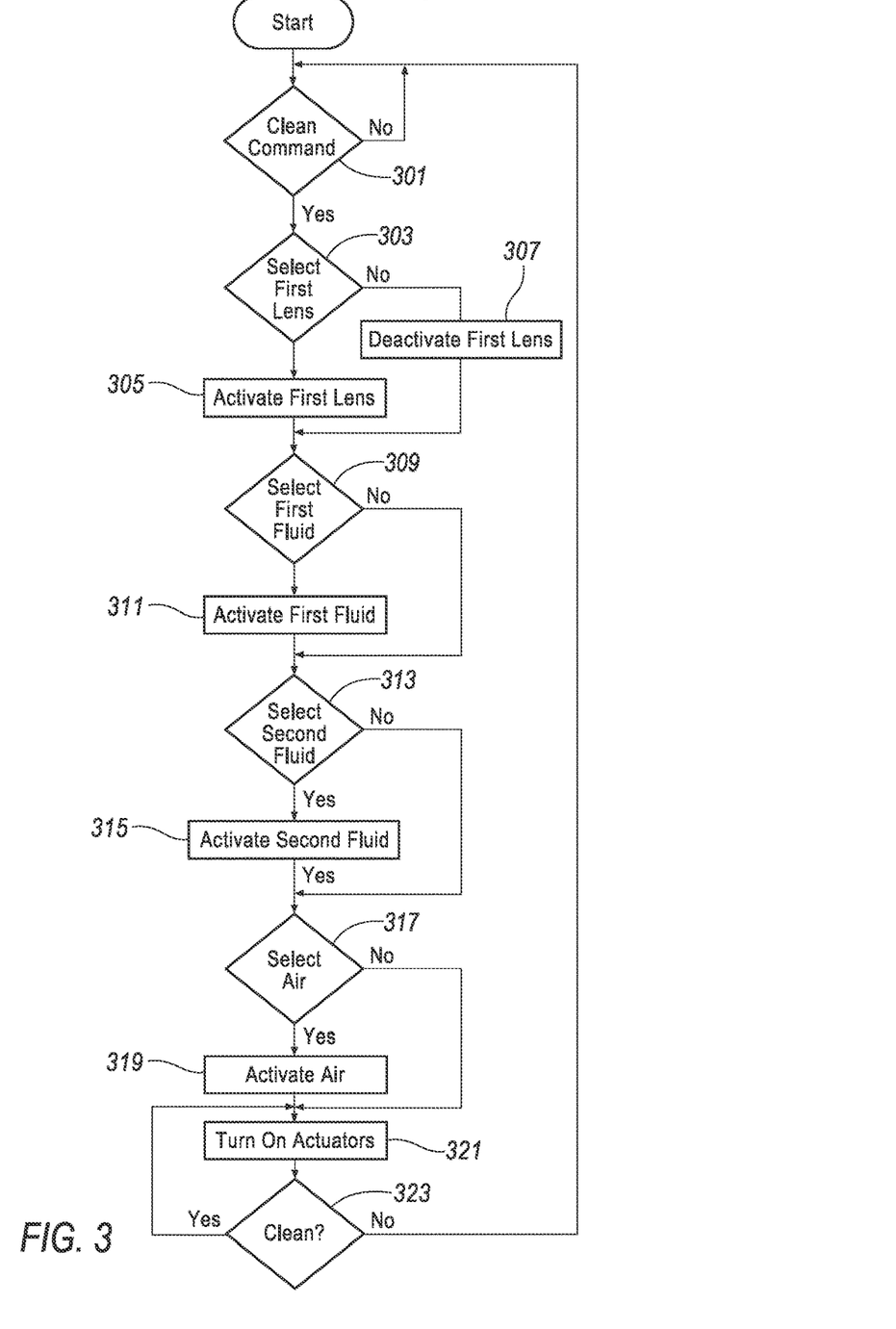
FIG. 3 illustrates an exemplary process of the present disclosure.

FIG. 3 illustrates an exemplary process 300 including, for example, operations of system 100, 200 and/or 500. Process 300 may take many different forms and include multiple and/or alternate steps, components, and arrangements. While an exemplary process is shown, the exemplary steps are not intended to be limiting, and additional or alternative steps, components and/or implementations may be used.

At diamond 301, ECU 207 may wait for a clean command, e.g., by way of from device 201 or platform electronics 211. Process 300 may start at diamond 301 and proceed to diamond 303 if a clean command is received, or diamond 301 may continue to wait for the clean command until it is received.

At diamond 303, ECU 207 may receive a selection of a first lens, e.g., by way of from device 201 or platform electronics 211.

At block 305, ECU 207 may activate the first lens, e.g., by way of from device 201 or platform electronics 211.

At block 307, ECU 207 may deactivate the first lens, e.g., by way of from device 201 or platform electronics 211.

At diamond 309, ECU 207 may receive and activate a first fluid selection of a plurality of fluids, e.g., by way of from device 201 or platform electronics 211.

At block 311, ECU 207 may initiate, e.g., by commands 213 to pressure source 102 for activation of the first fluid selection.

At diamond 313, ECU 207 may receive, e.g., by way of from device 201 or platform electronics 211, a second fluid selection of the plurality of fluids.

At block 315, ECU 207 may initiate activation of the second fluid selection.

At diamond 317, ECU 207 may determine an air type selection of a plurality of air types.

At block 319, ECU 207 may initiate activation of the air type selection.

At block 321, ECU 207 may turn on one or a plurality of actuators.

At diamond 323, ECU 207 may determine whether to continue the clean operation. If yes, process 300 may return to block 321. If no, process 300 may return to diamond 301. After diamond 323, process 300 may end or return to any other step.

Figure 4:
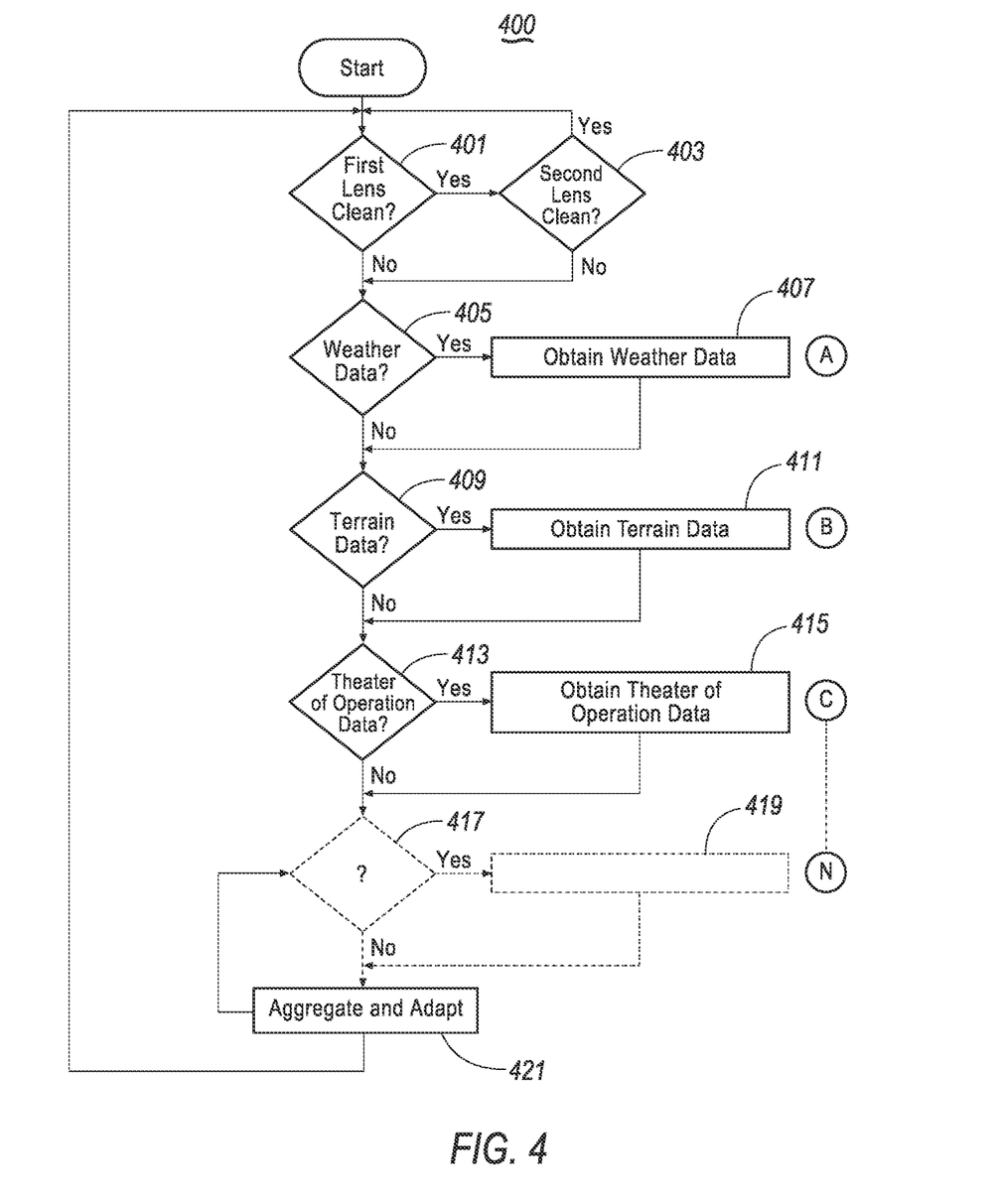
FIG. 4 illustrates an exemplary process of the present disclosure.

FIG. 4 illustrates an exemplary process 400 including, for example, operations of system 100, 200 and/or 500. Process 400 may take many different forms and include multiple and/or alternate steps, components, and arrangements. Process 400 may be configured to gather data including internal and external parameters from the systems herein as well as devices and vehicles external to the systems herein. Any step of processes 300 and 400 may be performed in combination to optimize the operations herein, e.g., cleaning vision-based surfaces. While an exemplary process is shown, the exemplary steps are not intended to be limiting, and additional or alternative steps, components and/or implementations may be used.

At diamond 401, ECU 207 may determine whether to initiate a first clean operation for a first lens of a plurality of lenses.

At diamond 403, ECU 207 may determine whether to initiate a second clean operation for a second lens of the plurality of lenses.

At diamond 405, ECU 207 may obtain and analyze a first parameter (e.g., weather data). At block 407, ECU 207 may obtain and analyze the first parameter as updated (e.g., updated weather data).

At diamond 409, ECU 207 may obtain and analyze a second parameter (e.g., terrain data). At block 411, ECU 207 may obtain and analyze the second parameter as updated (e.g., updated terrain data).

At diamond 413, ECU 207 may obtain an analyze a third parameter (e.g., theater of operation data). At block 415, ECU 207 may obtain and analyze the third parameter as updated (e.g., updated theater of operation data).

At diamond 417, ECU 207 may obtain and analyze a fourth parameter (e.g., additional information or data). At block 419, ECU 207 may obtain and analyze the fourth parameter as updated (e.g., updated additional information or data such as terrain data).

At block 421, ECU 207 may aggregate and adapt environmental inputs. After block 421, process 400 may end or return to any prior step, e.g., diamond 401, 405, 409, 413, or 417.

FIG. 5 illustrates an exemplary system 500 configured for automated fluid dispensing. System 500 may take many different forms and include multiple and/or alternate components, structures, and arrangements. While an exemplary system is shown, the exemplary components are not intended to be limiting, and additional or alternative components and/or implementations may be used.

FIGS. 5-8 illustrate an exemplary system 500 of the present disclosure, e.g., an intelligent automated system for cleaning vision-based surfaces. System 500 may include or be used in conjunction with any or all of systems 100, 200 and processes 300, 400. System 500 may include one or more of controller subsystem 101, source 102 (e.g., pressure and/or fluid source for containing a carrier fluid), reservoir 501 (e.g., reservoirs 501a, 501b, 501c), compressor 105, sensor 107, actuator 109 (e.g., reservoir mini-motor pumps), valve 111, pressure manifold 113, supply line 115, connector 505 (e.g., including male connector 505a and female connector 505b), sources 117a, 117b, 117c (e.g., fluid and/or air pressure source for containing spray mediums such as a condition-specific fluid (e.g., liquid and/or air)), heat source 123, distribution manifold 125, distribution block 129, nozzle 135 (e.g., nozzles 135a, 135b, 135c, 135d, 135e), vision-based surface 513 (e.g., vision-based surfaces 139, 141, 145), or a combination thereof.

Source 102 may include compressor 105, compressed air container 103, or a combination thereof. Actuator 109 may alternatively or additionally include actuator 121, actuator 127, actuator 131, or a combination thereof. Nozzle 135 may alternatively or additionally include nozzles 141, 143.

System 500 may include controller 101 (e.g., controller subsystem 101) operatively connected to source 102 (e.g., fluid and/or pressure source). Reservoir 501 (e.g., reservoirs 501a, 501b, 501c) may be configured to replenish and maintain fluid in fluid-air sources 117 (e.g., of liquid and/or air). Reservoir 501 may contain extra fluid depending on mission requirements, or to minimize fluid weight on movable vision-based surfaces, e.g., of a rotating gun. Reservoir 501 may be configured to contain and selectively release fluid by way of actuators 109 (e.g. actuators 109a, 109b, 109c), Actuators 109 may include any fluid mover such as a pump. Actuators 109 may be configured to selectively release fluid in response to controller 101, sensors 107, or a combination thereof. Source 102 may be connected to supply pressure control 507 by way of supply lines 115, connector 505, and valve 111. Connector 505 may include male connector 505a and female connector 505b configured to be connectable to each other.

Pressure control 507 may be configured to selectively distribute pressure between compressor 105 and fluid-air sources 117a, 117b, 117c (e.g., fluid mediums) according to a mixture type, an operation type, and/or a target vision area, e.g., in response to controller 101 in communication with sensors 107 and inputs 202. Compressor 105 may be connected to pressure control 507 by way of one or more of sensor 107, valve 111, and connector 505. Pressure control 507 may be connected to fluid-air sources 117a, 117b, 117c (e.g., spray mediums of fluid and/or air) by way of pressure manifold 113 and connectors 505.

Reservoirs 501, supply manifold 110, source 102, pressure control 507, and/or pressure manifold 113 may be connected to distribution manifold 125, distribution control 509, distribution block 129, valves 131, and/or nozzles 135. Any of these may be connected by way of supply lines 115, fluid sources 117, or a combination thereof. Any one or more supply lines 115 and/or fluid sources 117 may be configured to deliver fluid including liquid, air, or a combination thereof to any component herein.

Distribution control 509 may be configured to selectively distribute fluid between fluid-air sources 117a, 117b, 117c and nozzles 135a, 135b, 135c, 135d, 135e according to a mixture type, an operation type, and/or a target vision area, e.g., in response to controller 101 in communication with sensors 107. Distribution control 509 may be connected to nozzles 135 by way of distribution block 129, lines 115a, 115b, 115c, 115d, 115e, and valves 131a, 131b, 131c, 131d, 131e. Nozzles 135 may be configured to selectively direct a mixture of fluid-air sources 117a, 117b, 117c to respective portions of vision-based surface 513.

Any portion of the systems, apparatuses, methods, and processes herein may occur in any order or sequence. Certain components or steps may occur simultaneously, others may be added, and/or others may be omitted. This disclosure is provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. The embodiments of this disclosure are capable of modification and variation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," etc. should be read to recite one or more of the indicated elements unless a claim recites an explicit limitation to the contrary.

The Abstract of the Disclosure is provided to allow the reader to ascertain the nature of the technical disclosure, but it should not be used to interpret or limit the scope or meaning of the claims. Various features of this disclosure may be grouped together in various embodiments for the purpose of streamlining the disclosure, but the claimed embodiments shall not be interpreted as requiring more features than are expressly recited in each claim. The inventive subject matter of the claims lies in less than all features of a single disclosed embodiment. Thus, the following claims are hereby incorporated into the Detailed Description, with each claim standing on its own as a separately claimed subject matter.

What is claimed is:

1. An automated fluid dispensing system for a vision-based surface, the system comprising:
    a controller in communication with a plurality of sensors configured to receive an environmental condition and a vision condition of the vision-based surface;
    a replaceable pre-pressurized container providing a pressurized air supply;

a pressure manifold in communication with the replaceable pre-pressurized container, and a plurality of pressure supply lines;
a distribution manifold;
a distribution control in fluid communication with the distribution manifold; first, second, and third fluid-air sources having respective first, second, and third fluid-air types in a parallel arrangement between the pressure manifold and the distribution manifold, the first, second, and third fluid-air types including at least one of liquid and air, and the first, second, and third fluid-air sources being in communication with the pressurized air supply and respective ones of the plurality of pressure supply lines;
first, second, and third valves in fluid communication with the respective first, second and third fluid-air sources; and
a unitary nozzle in fluid communication, by way of the distribution control, with the first, second, and third fluid-air sources, the unitary nozzle being arranged according to the vision-based surface, wherein the controller is configured to:
communicate with a plurality of sensors regarding an environmental condition, a vision condition, and a target vision area of the vision-based surface;
automatically select a mixture type and an operation type according to the determined environmental condition, vision condition, and target vision area;
selectively activate the first, second and third valves to release the first, second, and third fluid-air types according to the selected mixture type;
mix, by the unitary nozzle in fluid communication with the distribution control, the first, second, and third fluid-air types of the respective first, second, and third fluid-air sources according to the selected mixture type; and
automatically clean, by way of the unitary nozzle, the vision-based surface by distributing the selected mixture type of the first, second and third fluid-air types via the unitary nozzle to the target vision area using the selected operation type.

2. The system of claim 1, the controller further configured to:
determine, by way of the plurality of sensors, the environmental condition, vision condition, and target vision area of the vision-based surface.

3. The system of claim 1, wherein the controller is further configured to automatically adjust in response to at least one of a user input and an external parameter.

4. The system of claim 1, wherein the plurality of sensors further includes at least one of a pressure sensor, a temperature sensor, fluid level sensor, humidity sensor, rain detection sensor, camera, GPS and LIDAR.

5. The system of claim 1, wherein the fluid sources include containers having respective bar codes, and further comprising an audiovisual indicator in communication with the controller, wherein the audiovisual indicator provides a visual or audio signal in response to a combination of fluid mediums being hazardous or explosive.

6. The system of claim 1, wherein the controller is configured to dynamically select and adjust, in real-time and during vehicle movement, one or more fluid mediums associated with the respective fluid sources.

7. The system of claim 1, wherein the controller is configured to respond to data of a vehicle command center.

8. The automated fluid dispensing system of claim 1, further comprising:

the controller in communication with the plurality of sensors configured to receive the environmental condition and the vision condition of the vision-based surface, wherein the plurality of sensors includes a temperature sensor;
a first heat source disposed upstream of the distribution manifold, and a second heat source disposed downstream of the distribution manifold; and
wherein the controller is configured to selectively control the first heat source and the second heat source in response to the temperature sensor.

9. An automated fluid dispensing apparatus for a vision-based surface, having a hardware controller, first, second, and third valves, a pressure manifold, first, second, and third fluid-air sources, a distribution control, a distribution manifold, and a unitary nozzle, and adapted to:
provide fluid communication, by way of the distribution control, between the unitary nozzle and the first, second, and third fluid-air sources respectively having first, second, and third fluid-air types in a parallel arrangement between the pressure manifold and the distribution manifold;
automatically determine, by the controller in communication with a plurality of sensors, a contaminant type disposed on a target vision area of the vision-based surface;
automatically select, by the controller, a mixture type and an operation type according to the contaminant type disposed on the target vision area of the vision-based surface;
selectively activate, by the controller in communication with the first, second and third valves, release of the first, second, and third fluid-air types according to the selected mixture type;
mix, by the unitary nozzle in fluid communication with the distribution control, the first, second, and third fluid-air types of the respective first, second, and third fluid-air sources according to the selected mixture type; and
automatically clean, by the controller in communication with the unitary nozzle, the vision-based surface by distributing the selected mixture type of the first, second and third fluid-air types via the unitary nozzle to the target vision area using the selected operation type.

10. The automated fluid dispensing apparatus of claim 9, further adapted to selectively pressurize, by a pressure source according to external parameters, at least the first, second, and third fluid-air types, wherein the pressure source includes a replaceable pre-pressurized container.

11. The automated fluid dispensing apparatus of claim 9, wherein the contaminant type disposed on the target vision area of the vision-based surface comprises a paint spray, and wherein the mixture type comprises one of a thinner or a solvent.

12. An automated fluid dispensing system for a vision-based surface, comprising a controller, a plurality of sensors, first, second, and third valves, first, second, and third fluid-air sources, a distribution control, and a unitary nozzle, and adapted to:
provide fluid communication between the unitary nozzle and the first, second, and third fluid-air sources respectively having first, second, and third fluid-air types;
automatically determine, by the controller in communication with the plurality of sensors, an environmental condition, a vision condition, and a target vision area of the vision-based surface;

receive an external vehicle signal of a vehicle having the vision condition in a common geographical location;

automatically select, by the controller, a mixture type and an operation type according to the determined environmental condition, vision condition, and target vision area;

selectively activate, by the controller in communication with the first, second and third valves, release of the first, second, and third fluid-air types according to the selected mixture type;

mix, by the unitary nozzle in fluid communication with the distribution control, the first, second, and third fluid-air types of the respective first, second, and third fluid-air sources according to the selected mixture type;

automatically clean, by the controller in communication with the unitary nozzle, the vision-based surface by distributing the selected mixture type of the first, second and third fluid-air types via the unitary nozzle to the target vision area using the selected operation type;

determine an effectiveness of the selected operation type to clean the vision-based surface based upon a cleanliness threshold; and adapt the selected operation type based upon the effectiveness of the selected operation type to achieve the cleanliness threshold to clean the vision-based surface.

13. The automated fluid dispensing system of claim 12, wherein the controller is further adapted to:

automatically determine an initial vision condition according to at least one of user inputs, sensor information, and external parameters;

automatically select one or more cleaning parameters for at least one of fluid media type, fluid volume, air volume, injection time, mixture, applied pressure, temperature, spray time, and spray pattern;

automatically deploy fluid according to the selections;

determine an updated vision condition according to the at least one of user inputs, sensor information, and external parameters;

compare the initial and updated vision conditions to a threshold; and adapt the cleaning parameters based on such comparison.

14. The automated fluid dispensing system of claim 12, wherein the controller is further adapted to selectively activate the first, second and third valves to distribute of the respective first, second and third fluid-air types to the target vision area in response to the plurality of sensors, and further comprising a pressure manifold and a distribution manifold, wherein the distribution control is in fluid communication with the distribution manifold, the first, second, and third fluid-air sources are in a parallel arrangement between the pressure manifold and the distribution manifold, the unitary nozzle is in fluid communication with the first, second, and third fluid-air sources by way of the distribution control, and the mixing is performed with the unitary nozzle in fluid communication with the distribution control.

15. The automated fluid dispensing system of claim 12, wherein the controller is further adapted to respond to at least one of user inputs, sensor inputs, and external inputs, and automatically adjust in response to external parameters.

16. The automated fluid dispensing system of claim 12, wherein the plurality of sensors includes at least one of a pressure sensor, a temperature sensor, fluid level sensor, humidity sensor, rain detection sensor, camera, GPS and LIDAR, and wherein the controller is further adapted to:

provide a pressure source configured to pressurize the first, second, and third fluid-air types, wherein the pressure source includes a replaceable pre-pressurized container.

17. The automated fluid dispensing system of claim 12, wherein the fluid sources include containers having respective bar codes, and the controller is further adapted to:

provide an audiovisual indicator in communication with the controller, and indicate, by the audiovisual indicator, a visual or audio signal in response to a combination of fluid-air types being hazardous or explosive.

18. The automated fluid dispensing system of claim 12, the controller being further adapted to dynamically select and adjust, by the controller in-real time and during vehicle movement, one or more fluid-air types associated with the respective fluid-air sources.

19. The automated fluid dispensing system of claim 12, the controller being further adapted to automatically respond, by the controller, to data of at least one of a vehicle command center and an intelligence source.

20. The automated fluid dispensing system of claim 12, the controller being further adapted to dynamically respond, by the controller without human intervention, to at least one of environmental conditions and external vehicle signals.

* * * * *